(12) United States Patent
Choi et al.

(10) Patent No.: US 10,079,755 B2
(45) Date of Patent: Sep. 18, 2018

(54) PROGRAMMABLE SYSTEM ARCHITECTURE FOR ROUTING DATA PACKETS IN VIRTUAL BASE STATIONS

(71) Applicant: Alcatel-Lucent USA Inc., Murray Hill, NJ (US)

(72) Inventors: Nakjung Choi, Florham Park, NJ (US); Binh Nguyen, Salt Lake City, UT (US); Marina Thottan, Westfield, NJ (US)

(73) Assignee: Nokia of America Corporation, Murray Hill, NJ (US)

( * ) Notice: Subject to any disclaimer, the term of this patent is extended or adjusted under 35 U.S.C. 154(b) by 189 days.

(21) Appl. No.: 15/068,953

(22) Filed: Mar. 14, 2016

(65) Prior Publication Data

US 2017/0264535 A1 Sep. 14, 2017

(51) Int. Cl.
*H04W 4/00* (2018.01)
*H04L 12/721* (2013.01)
*H04W 72/04* (2009.01)
*H04W 48/16* (2009.01)
*H04L 29/06* (2006.01)
*H04L 12/46* (2006.01)
*H04L 12/24* (2006.01)
*H04W 88/00* (2009.01)
(Continued)

(52) U.S. Cl.
CPC .......... *H04L 45/38* (2013.01); *H04L 12/4641* (2013.01); *H04L 41/0896* (2013.01); *H04L 69/22* (2013.01); *H04W 48/16* (2013.01); *H04W 72/04* (2013.01); *H04W 88/00* (2013.01); *H04W 88/085* (2013.01); *H04W 84/045* (2013.01)

(58) Field of Classification Search
None
See application file for complete search history.

(56) References Cited

U.S. PATENT DOCUMENTS

2009/0170472 A1 7/2009 Chapin et al.
2014/0248862 A1* 9/2014 Periyalwar ............ H04W 48/18
455/418
2015/0303950 A1 10/2015 Shattil
(Continued)

OTHER PUBLICATIONS

International Search Report and Written Opinion of the International Searching Authority from corresponding International Application PCT/US2017/021703, dated May 19, 2017.
(Continued)

*Primary Examiner* — Phirin Sam
(74) *Attorney, Agent, or Firm* — Harness, Dickey & Pierce, P.L.C.

(57) ABSTRACT

In one example embodiment, a distributed platform includes at least one node for performing baseband processing of signals, the at least one node including a memory and a processor. The memory has computer-readable instructions stored therein. The processor is configured to the execute computer-readable instructions to enable independent operations of a plurality of radio protocol stacks and a plurality of backhaul protocol stacks for performing the base band processing functions of a plurality of base stations, each of the plurality of base stations being configured to serve one or more user devices. The processor is further configured to manage data packet flows between the plurality of radio protocol stacks and the plurality of backhaul protocol stacks.

18 Claims, 3 Drawing Sheets

(51) Int. Cl.
*H04W 88/08* (2009.01)
*H04W 84/04* (2009.01)

(56) References Cited

U.S. PATENT DOCUMENTS

| | | | |
|---|---|---|---|
| 2016/0014836 A1* | 1/2016 | Pinheiro | H04L 5/0085 |
| | | | 370/329 |
| 2016/0134317 A1* | 5/2016 | Hu | H04B 1/3816 |
| | | | 455/558 |
| 2016/0150530 A1* | 5/2016 | Fujisaki | H04W 36/0005 |
| | | | 370/329 |
| 2016/0286472 A1* | 9/2016 | Periyalwar | H04W 48/18 |
| 2017/0086111 A1* | 3/2017 | Vrzic | H04W 36/023 |
| 2017/0126853 A1* | 5/2017 | Goel | H04L 69/22 |

OTHER PUBLICATIONS

Haberland, et al., "Radio Base Stations in the Cloud," *Bell Labs Technical Jourhal*, vol. 18, No. 1, Jun. 30, 2013, pp. 129-152.

\* cited by examiner

PROGRAMMABLE SYSTEM ARCHITECTURE FOR ROUTING DATA PACKETS IN VIRTUAL BASE STATIONS

BACKGROUND

In Long-Term Evolution (LTE) networks, a base station (e.g., an e-NodeB) is implemented based on proprietary purpose-built hardware, which hinders adaptation of such networks to fast changing network conditions, demands, services, etc. Recently, as part of a trend for moving toward virtualization of network functions for a Radio Access Network (RAN) in order to address the above-mentioned shortcomings, base band units (BBU) of such e-NodeBs are virtualized and implemented on a cloud environment (as one of Virtualized Network Function (VNF) use cases run over commercial off-the-shelf (COTS) servers). In such a trend, flexibility and controllability are important to fully exploit the advantage of the given cloud environment.

However, a vBBU according to the state of the art keeps a tightly-coupled radio and backhaul protocol stacks, which makes it difficult to provide a truly flexible and controllable path between radio and backhaul (or edge cloud) parts of the vBBU in the cloud environment. For example, in a distributed cloud with distributed evolved packet cores (EPCs), the vBBU of each e-NodeB needs to be connected to (or shared by) different physical/logical backhaul links to the EPCs (or edge clouds).

Moreover, due to a processing time requirement, Layer 2 (L2) and Layer 3 (L3) processing are virtualized over general purpose processors (GPP) while Layer 1 (L1) radio communications are run over special hardware, e.g., a graphical processor unit (GPU) array.

While the above described schemes that are currently available, provides better flexibility compared to hardware proprietary purpose-built e-NodeBs, the embedding of backhaul protocol stacks inside vBBUs prevents flexible mapping between radio and backhaul resources and backhaul resources to truly scale independent of radio protocol stacks (i.e., the number of backhaul protocol stacks scales with the number of vBBUs). In other words, the current design of vBBUs does not allow customized VNFs to be added inside eNBs, especially between the radio and backhaul protocol stacks.

SUMMARY

In one example embodiment, a distributed platform includes at least one node for performing baseband processing of signals, the at least one node including a memory and a processor. The memory has computer-readable instructions stored therein. The processor is configured to the execute computer-readable instructions to enable independent operations of a plurality of radio protocol stacks and a plurality of backhaul protocol stacks for performing the base band processing functions of a plurality of base stations, each of the plurality of base stations being configured to serve one or more user devices. The processor is further configured to manage data packet flows between the plurality of radio protocol stacks and the plurality of backhaul protocol stacks.

In yet another example embodiment, the processor is configured to manage the data packet flows by routing one or more data packets from any one of the plurality of radio protocol stacks or any one of the plurality of backhaul protocol stacks to any other one of the plurality of radio protocol stacks and any other one of the plurality of backhaul protocol stacks; and from any one of the plurality of radio protocol stacks or any one of the plurality of backhaul protocol stacks to one or more virtualized network functions implemented by the processor.

In yet another example embodiment, the processor is further configured to execute the computer-readable instructions to receive a request from at least one service provider to provide a slice of the distributed platform to the service provider; and provide the slice to the at least one service provider, the slice providing resources to the at least one service provider to perform base band processing of signals for ones of the one or more user devices serviced by the at least one service provider.

In yet another example embodiment, the processor is configured to utilize the provided slice and execute the computer-readable instructions to, receive data packets from, or destined for, the ones of the one or more user devices, perform a first modification of the received data packets, manage the data packet flows by routing the first modified data packets to one of the plurality of radio protocol stacks or one of the plurality of backhaul protocol stacks, perform a second modification of the routed data packets, and transmit the second modified data packets to intended destinations.

In yet another example embodiment, the processor is configured to perform the first modification by implementing a first one of the plurality of radio protocol stacks or a first one of the plurality of backhaul protocol stacks.

In yet another example embodiment, the processor is configured to perform the second modification by implementing a second one of the plurality of radio protocol stacks, or a second one of the plurality of backhaul protocol stacks.

In yet another example embodiment, the processor is configured to receive the data packets via one or more remote radio heads, a remote radio head being remotely located relative to the platform and communicating with corresponding ones of the one or more user devices.

In yet another example embodiment, the distributed platform includes a plurality of nodes including the at least one node, the at least one node being configured to, perform the first modification by instructing a first one of the plurality of nodes to implement at least one of the plurality of radio protocol stacks or one of the plurality of backhaul protocol stacks, perform the second modification by instructing a second one of the plurality of nodes to implement at least another one of the plurality of radio protocol stacks or another one of the plurality of backhaul protocol stacks, and manage the data packet flows between the first one of the plurality of nodes and the second one of the plurality of nodes, the at least one node being any one of the plurality of nodes including the first one of the plurality of nodes and the second one of the plurality of nodes.

In yet another example embodiment, the plurality of base stations are virtual e-NodeBs, each having functionalities of an e-NodeB implemented by the at least one node of the distributed platform and the processor is configured to service two or more service providers simultaneously.

In one example embodiment, a number of the plurality of radio protocol stacks is different from a number of the plurality of backhaul protocol stacks.

In one example embodiment, a method of performing baseband processing of signals on a distributed platform includes enabling independent operations of a plurality of radio protocol stacks and a plurality of backhaul protocol stacks for performing the base band processing functions of a plurality of base stations, each of the plurality of base stations being configured to serve one or more user devices, and managing data packet flows between the plurality of radio protocol stacks and the plurality of backhaul protocol stacks.

In yet another example embodiment, the managing the data packet flows includes routing one or more data packets from any one of the plurality of radio protocol stacks or any one of the plurality of backhaul protocol stacks to any other one of the plurality of radio protocol stacks and any other one of the plurality of backhaul protocol stacks, and any one of the plurality of radio protocol stacks or any one of the plurality of backhaul protocol stacks to one or more virtualized network functions.

In yet another example embodiment, the method further includes receiving a request from at least one service provider to provide a slice of the distributed platform to the service provider, and providing the slice to the at least one service provider, the slice providing resources to the at least one service provider to perform base band processing of signals for ones of the one or more user devices.

In yet another example embodiment, the method further includes utilizing the slice of the platform to, receive data packets from, or destined for, the ones of the one or more user devices, perform a first modification of the received data packets, manage the data packet flows by routing the first modified data packets to one of the plurality of radio protocol stacks or one of the plurality of backhaul protocol stacks; perform a second modification of the routed data packets, and transmit the second modified data packets to intended destinations.

In yet another example embodiment, the performing the first modification performs the first modification by implementing a first one of the plurality of radio protocol stacks, or a first one of the plurality of backhaul protocol stacks.

In yet another example embodiment, the first modification is based on at least one of network traffic conditions and specifications provided by the at least one service provider.

In yet another example embodiment, the performing the second modification performs the first modification by implementing a second one of the plurality of radio protocol stacks, or a second one of the plurality of backhaul protocol stacks.

In yet another example embodiment, the second modification is based on at least one of network traffic conditions and specifications provided by the at least one service provider.

In yet another example embodiment, the performing the first modification performs the first modification by instructing a first one of a plurality of nodes of the distributed platform to implement at least one of the plurality of radio protocol stacks or one of the plurality of backhaul protocol stacks. The performing the second modification performs the second modification by instructing a second one of the plurality of nodes to implement at least another one of the plurality of radio protocol stacks or another one of the plurality of backhaul protocol stacks. The managing manages the data packet flows between the first one of the plurality of nodes and the second one of the plurality of nodes, the at least one node being any one of the plurality of nodes including the first one of the plurality of nodes and the second one of the plurality of nodes.

In yet another example embodiment, the data packet flow includes at least one data packet transmitted between the one or more user devices and one or more evolved packet cores of one or more service providers.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present disclosure, and wherein.

DETAILED DESCRIPTION OF EXAMPLE EMBODIMENTS

Figure 1:
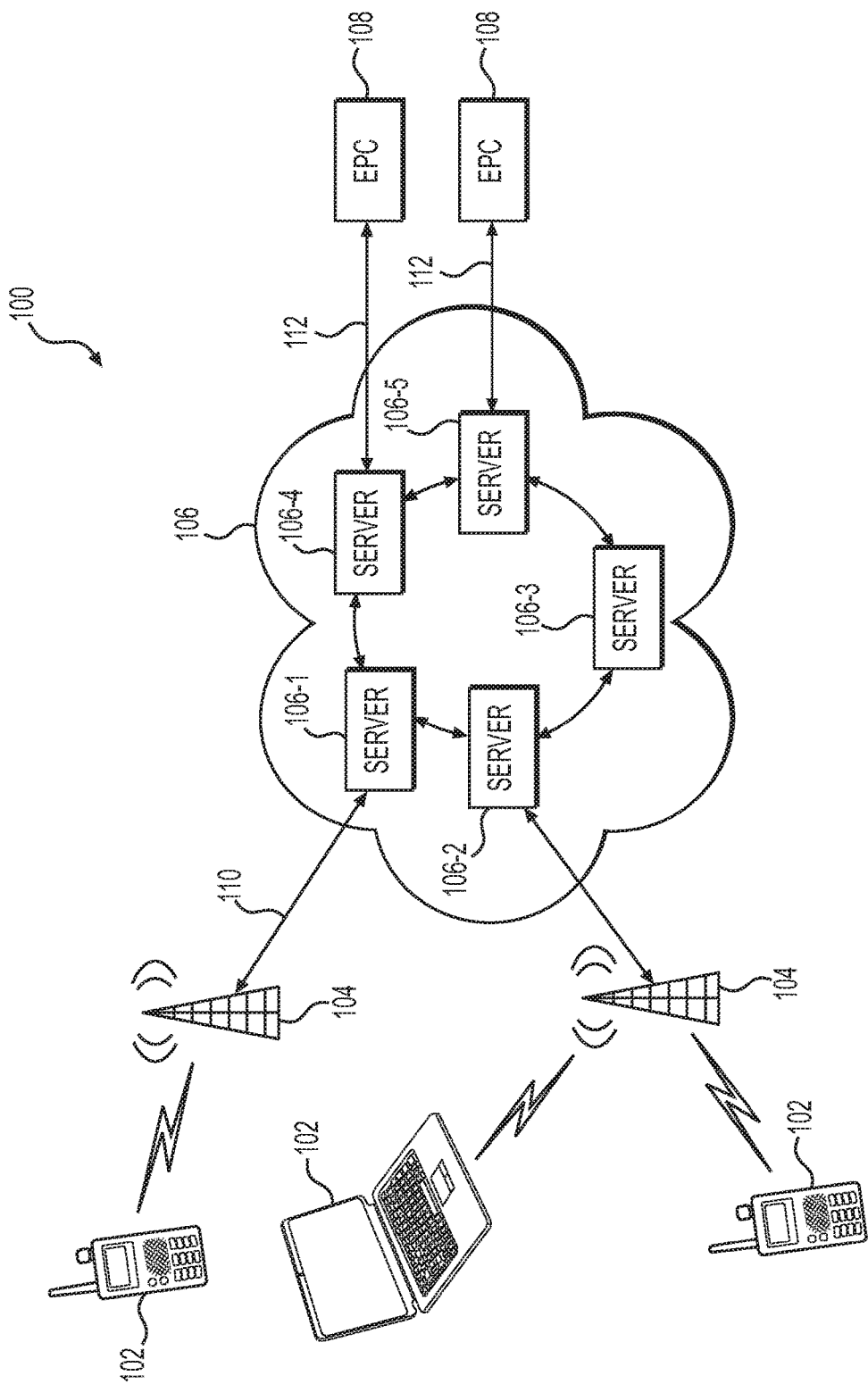
FIG. 1 illustrates a wireless communication network including a virtualized baseband unit, according to an example embodiment.

Various embodiments will now be described more fully with reference to the accompanying drawings. Like elements on the drawings are labeled by like reference numerals.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs), computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware, or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

Example embodiments may be utilized in conjunction with RANs such as: Universal Mobile Telecommunications System (UMTS); Global System for Mobile communications (GSM); Advance Mobile Phone Service (AMPS) system; the Narrowband AMPS system (NAMPS); the Total Access Communications System (TACS); the Personal Digital Cellular (PDC) system; the United States Digital Cellular (USDC) system; the code division multiple access (CDMA) system described in EIA/TIA IS-95; a High Rate Packet Data (HRPD) system, Worldwide Interoperability for Microwave Access (WiMAX); Ultra Mobile Broadband (UMB); and $3^{rd}$ Generation Partnership Project LTE (3GPP LTE).

The rapid growth in mobile traffic volume and the increasingly dynamic nature thereof, in addition to the many new types of user devices and applications utilized on currently deployed wireless communication networks, make it difficult for operators to predict a level of demand for network resources by such user devices. As a result, most network operators are searching for ways to cope with current and anticipated mobile data traffic challenges. For example, the network operators are seeking the most cost-effective way to add flexibility in their network to support user demand more dynamically and secure their network investments during future evolutions. The advent of LTE over the past five years has made it obvious that significant changes to RAN architectures may assist network operators in addressing such challenges.

Several major RAN evolutions toward virtualization of base stations (e.g., e-NodeBs) have already been developed to support the growing importance of IP and the accelerated transition from ground-based radio modules to tower-mounted remote radio heads (RRHs). But VNF, as a global trend across all the domains of a wireless communication network, such as the evolved Packet Core (EPC) and/or the IP Multimedia Subsystem (IMS), enables more radical changes that will bring real disruptions in the way future RAN networks are designed.

Network virtualization offers the option to leverage new and more powerful general purpose processors (GPP), move existing and new functions onto such GPPs and run the functionalities of RANs at the best possible location in a network (e.g., on a cloud environment accessible remotely by requesting vendors). For example, by leveraging GPPs, it is possible to run the baseband processing functions of BBUs on IT servers installed at a central location rather than having all such baseband processing performed at each cell site on custom hardware (e.g., at each e-NodeB).

Doing so enables superior scalability and pooling and easier coordination between radio resources. Furthermore, such centralization of the baseband processing, improves the speed and ease of deployment of the necessary hardware equipment at the central location(s) and simplifies operations.

Centralization of BBUs without virtualization achieves some of these above-described benefits, but may be further improved. For example and as described in the Background Section, a vBBU according to the state of the art keeps a tightly-coupled radio/backhaul protocol stacks, which makes it difficult to provide a truly flexible and controllable path between radio and backhaul (or edge cloud) parts of the vBBU in the cloud environment. For example, in a distributed cloud with distributed evolved packet cores (EPCs), the vBBU of each e-NodeB needs to be connected to (or shared by) different physical/logical backhaul links to the EPCs (or edge clouds).

Decoupling of radio and backhaul protocol stacks would allow the EPCs to be truly separated from the radio protocol stack and therefore be scaled independently of the radio protocol stacks of the vBBUs to realize the "infinite" resource notion in EPC core. Hereinafter, example embodiments will be described for realizing the mentioned decoupling of the radio and backhaul protocol stacks as well as managing communications therebetween.

FIG. 1 illustrates a wireless communication network including a virtualized baseband unit, according to an example embodiment.

A wireless communication system 100 (hereinafter, referred to as system 100) includes three user devices 102, two remote radio heads (RRHs) 104, a network of servers 106 (formed of servers 106-1 to 106-5) and two EPCs 108. While system 100 has been illustrated as having three user devices 102, two RRHs 104, five servers 106-1 to 106-5 and two EPCs 108, example embodiments are not limited thereto and the system 100 may include any number of end user devices, RRHs, servers and EPCs. Additionally and while not shown, the system 100 may include any other component necessary for the operations thereof, as known to those skilled in the art.

The user devices 102 may be any one of, but not limited to, a mobile phone, a tablet, a gadget with wireless communication capabilities (e.g., a heart rate monitor), a laptop, etc. The RRHs 102 may be any known, or to be developed RRHs and may be installed on towers at various locations as determined by a particular wireless service provider (e.g., at locations where macro cell base stations, small cell base stations, etc. are currently located).

Example embodiments described herein will be based on the assumption that the system 100 is an LTE based wireless communication system. However, example embodiments are not limited thereto and may encompass any other technology used for wireless communication systems. For example, inventive concepts may be applied to any system operating based on 3GPP specification that utilizes the concept of a base station having radio and backhaul protocol stacks.

Each of the RRHs 104 may be any known or to be developed RRH. In one example embodiment, each of the RRHs 104 is connected to the server 106 via dedicated physical line connection 110 such as a fiber optic cable or any other known or to be developed means for physically connecting the RRHs 104 and the server 106 (such connection between each RRH 104 and the server 106 may also be referred to as a fronthaul connection or radio connection).

Each of the servers 106-1 to 106-5 of the network of servers 106 may include, among other known or to be developed components, a processor, a memory, a switch and a router. The memory of each of the servers 106-1 to 106-5 107-2 may have, among other types of data, sets of computer readable instructions stored therein, which when executed by the corresponding processor, transform the corresponding processor into a special purpose processor for implementing the functionalities of a plurality of e-NodeBs servicing the user devices 102, including but not limited to baseband processing of signals received at one or more of the servers 106-1 to 106-5 (e.g., L1-L3 processing of signals). In one example embodiment, the corresponding processor of each of the servers 106-1 to 106-5 is formed of several general purpose processors (GPPs) that are commercially available. The network of servers 106 will be described in detail with respect to FIG. 2.

In one example embodiment, each of the servers 106-1 to 106-5 may be located at a geographical location different from that at which any of the RRHs 104 may be located. Furthermore, as shown in FIG. 1, not all of the servers 106-1 to 106-5 communicate directly with the RRHs 104. For example and as shown in FIG. 1, only the servers 106-1 and 106-2 may be directly connected and while being located at different geographical locations, the servers 106-1 and 106-2 may be connected via a wired/physical connection between the RRHs 104 and the server 106 (e.g., the servers 106-1 and 106-2 and the RRHs 104 may be a few kilometer/miles apart from one another, where the exact separation therebetween may be based on network service requirements and/or various network deployment scenarios).

In one example embodiment, the separation between the server 106-1 and/or server 106-2 and any of the RRHs 104 may be large enough such that establishing connections between the RRHs 104 and the server 106-1 and/or 106-2 using cables and wires is not possible. In such instance, the communications between the RRHs 104 and the server 106-1 and/or server 106-2 may be wireless and based on any known or to be developed wireless communication standard/technology.

In one example embodiment and while the servers 106-1 and 106-2 are directly connected to the RRHs 104 (via wired and/or wireless connections as described above), the remaining servers 106-3-106-5 are indirectly connected to the RRHs 104 via the servers 106-1 and 106-2. The communication between the servers 106-1 to 106-5 may be wired, wireless and/or a combination of both. Furthermore, the communication between any two of the servers 106-1 to 106-5 may be direct or indirect via another one of the servers 106-1 to 106-5. Accordingly, the server network 106 may be said to constitute a distributed platform for baseband signal processing and/or a distributed vBBU.

In one example embodiment, one or more of the server 106-1 to 106-5 of the network of servers 106 may be connected to one or more EPCs 108 via a dedicated physical line/connection 112 such as a fiber optic cable and/or any other known or to be developed means for physically connecting the server 106 and the EPCs 108. For example and as shown in FIG. 1, from among the servers 106-1 to 106-5, only the servers 106-4 and 106-5 are connected directly to the EPCs 108, while the remaining servers 106-1 to 106-3 are indirectly connected to the EPCs 108 via one or more of the servers 106-4 and 106-5. It should be noted that while in example embodiments corresponding to FIG. 1, there are equal number of the servers 106-1 to 106-5 that are directly connected to the RRHs 104 and the EPCs 108, example embodiments are not limited thereto. For example, there may be a single server from among the servers 106-1 to 106-5, which is directly connected to the EPCs 108 and at the same time there may be three servers from among the servers 106-1 to 106-5, which are directly connected to the RRHs 104, or vice-versa.

From among the servers 106-1 to 106-5 of the network of servers 106, the server 106-3 may function as a switching controller, which will be further described below. However, example embodiments are not limited thereto and any of the servers 106-1 to 106-5 may function as a switching controller, as will be further described.

Figure 2:
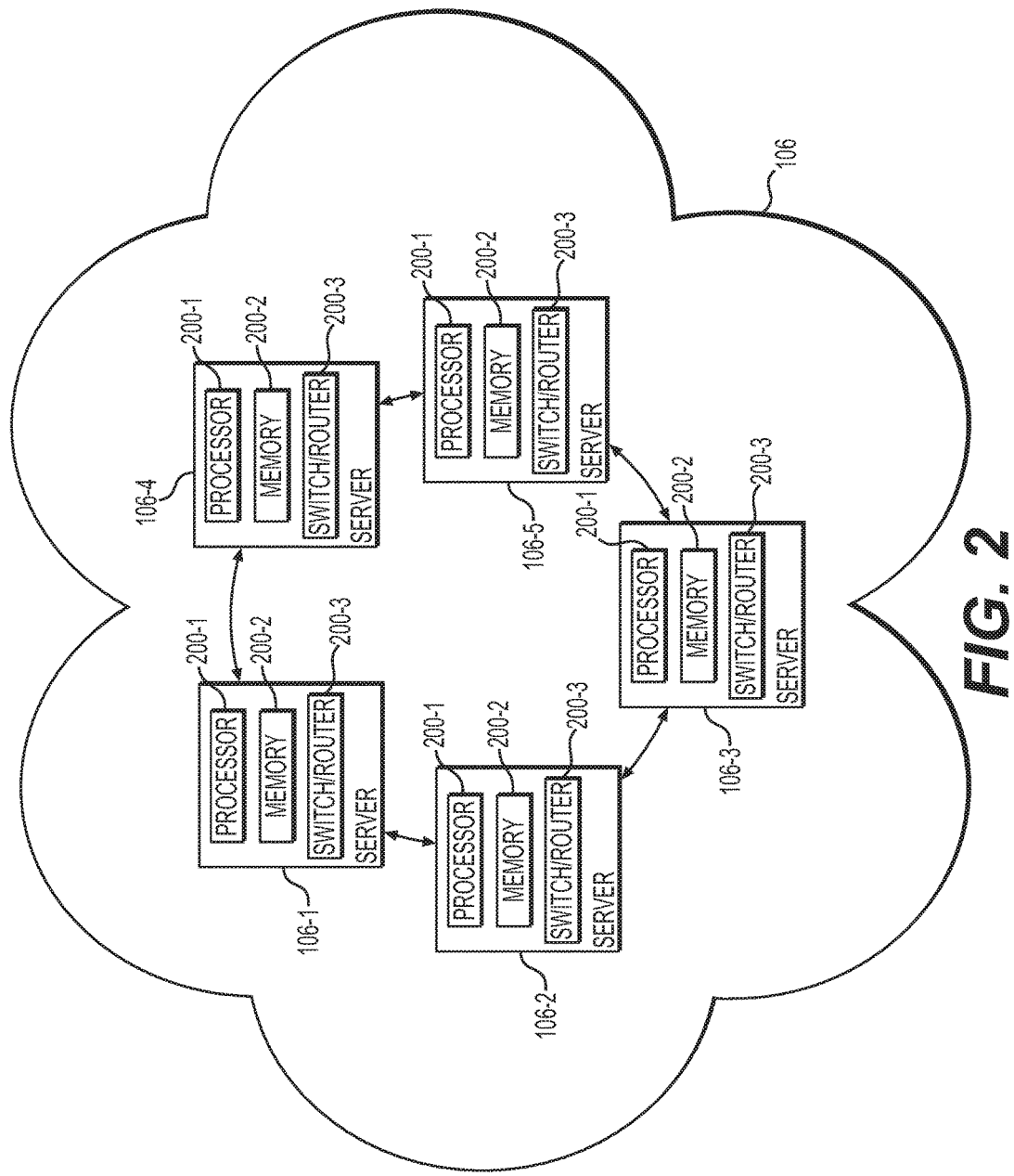
FIG. 2 illustrates the network of servers of FIG. 1, according to an example embodiment.

FIG. 2 illustrates the network of servers of FIG. 1, according to an example embodiment. It should be noted that while FIG. 2 illustrates the network of servers 106 as having a ring topology, example embodiments are not limited thereto and that any topology may be utilized for forming the network of servers 106. In one example embodiment, the topology of the network of servers 106 may be determined by one of the servers 106-1 to 106-5 that implement the functionalities of a RAN SD i-Switching controller, which will be further described below.

As shown in FIG. 2 and as briefly described with reference to FIG. 1, each of the servers 106-1 to 106-5 of the network of servers 106 of FIG. 1 includes a processor 200-1, a memory 200-2 and a switch/router 200-3. Furthermore, each of the servers 106-1 to 106-5 may also be referred to as a node or a computing node of the network of servers 106.

In one example embodiment, the processor 200-1 may be formed of one or more GPPs. In one example embodiment and in case of the processor 200-1 being formed of two or more GPPs, the two or more GPPs may be coupled together (pooled together) via a switch (not shown). The GPP(s) and/or the switch may be any know and/or to be developed GPPs and switches. In one example embodiment, the number of GPPs used for the processor 200-1 varies (is determined), depending on network capacity requirements and/or wireless network service providers.

The memory 200-2 may be any known or to be developed storage device for storing, among other types of data and information, computer-readable instructions (e.g., software codes) for carrying out baseband processing of signals by the corresponding processor 200-1. In one example embodiment, each of the servers 106-1 to 106-5 may not store said computer-readable instructions locally, but may rather retrieve said computer-readable instructions from another one of the servers 106-1 to 106-5 and/or from another storage facility that is accessible via the cloud.

The switch/router 200-3 may be any known or to be developed switch/router that may be used for communicating processed (or unprocessed) data packets from one of the servers 106-1 to 106-5 to another one of the servers 106-1 to 106-5. The switch/router 200-3 may also be used to switch the functionalities of one of the servers 106-1 to 106-5 to another one of the servers 106-1 to 106-5, depending on performance capabilities and load/processing capacities of each of the servers 106-1 to 106-5. While in FIG. 2, the switch and the router of each server 106-1 to 106-5 is shown as a combined single unit 200-3, example embodiments are not limited thereto and instead the switch and the router may be embodied as two different components inside each of the servers 106-1 to 106-5.

Baseband processing of signals by an LTE e-NodeB, as known to those skilled in the art, involves reconfiguring data packets (e.g., reconfiguring header information, IP addresses for source, destination etc.) received from/to be transmitted to end user devices at an e-NodeB at the radio (fronthaul) side of the e-NodeB. Such reconfiguration and processing may be done via what is referred as a radio protocol stack. Thus the e-NodeB may be said to include a radio protocol unit (RPU) for carrying the reconfiguration and processing of data packets received from/to be transmitted to user devices.

Similarly, the baseband processing of signals also includes reconfiguration and processing of data packets (e.g., reconfiguring header information, IP addresses for source, destination etc.) received from/to be transmitted to core network elements (e.g., EPCs 108) at an e-NodeB at the backhaul side of the e-NodeB. Such reconfiguration and processing may be done via what is referred as a backhaul protocol stack. Thus the e-NodeB may be said to include a backhaul protocol unit (BPU) for carrying the reconfiguration and processing of data packets received from/to be transmitted to core network elements.

As mentioned in the Background Section of this application, current schemes for a vBBU embeds radio and backhaul protocol stacks inside an e-NodeB protocol stack thus providing a tight coupling of the radio and backhaul protocol stacks. The embedding of the backhaul protocol stack inside a vBBU limits the scalability of EPC resources independent of network radio resources, as described above.

In order to address the above described limitation of current vBBUs, example embodiments described herein, enable separation of the e-NodeB protocol stack into separate sets of software-defined commands corresponding to each of the radio and backhaul protocol stacks for processing data packets, which would then be connected via an RAN software defined internal switch (which may also be referred to as an RAN SD i-Switching Controller). The RAN SD i-Switching Controller will be further described below. Hereinafter and in describing example embodiments, references may be made to various types of controllers, agents, switches, units, etc. However, it will be understood that the functionalities of referenced controllers, agents, switches, etc., are implemented by one or more processors such as one or more processors 200-1 of the servers 106-1 to 106-5 of the server network 106 through execution of computer-readable instructions/commands (software-defined instructions) stored on a memory such as one or more of the memories 200-2. Software defined functionalities of the vBBU, according to example embodiments are as follows.

In one example embodiment, each of the servers 106-1 to 106-5 in the network of servers 106 may be used to implement the processing functionalities of the radio and/or backhaul protocol stacks. For example, when a data packet is received from the user device 102 via one of the RRHs 104, the server 106-1 may execute software-defined commands of the radio protocol stack to perform the fronthaul/radio processing on the received data packet. Thereafter, the processed data packet may be routed (via a RAN software defined network (SDN) i-Switching controller, which will be described below) to another one of the servers 106-1 to 106-5 for backhaul processing. In one example embodiment, each server that performs the fronthaul/radio processing of data packets may be referred to as a relay agent for the radio protocol stack, while each server that performs the backhaul processing of data packets may be referred to as a relay agent for the backhaul protocol stack.

Accordingly, example embodiments provide for separation/decoupling of the backhaul and fronthaul processing of data packets (through software-defined implementation of the backhaul and radio protocol stacks via different one of the servers 106-1 to 106-5).

While example embodiments enable separation implementation of the backhaul and fronthaul processing using different servers in the network of servers 106, a single one of the servers 106 may be used to perform both the fronthaul and backhaul processing of data packets, depending on the routing/switching decisions provided by, for example, the RAN SDN i-Switching controller, which will be further described below.

In one example embodiment, each of the radio and backhaul protocol stacks has an internal software defined network (SDN) switch to control switching/routing of data packets inside an e-NodeB. For example, an Open vSwitch (OVS) is attached to each radio protocol stack and backhaul protocol stack. With regard to the backhaul protocol stack, an SDN switch may implement the L1/L2 and/or other layer functions, e.g., UDP/IP/GTP-U, of the backhaul protocol stack. In one example embodiment and as mentioned above, each of the radio and backhaul protocol stacks may be referred to as an SD relay agents having application program interface (API) to dynamically set up relay and tunnel information between separated radio and backhaul protocol stacks.

In one example embodiment, an SD relay agent (corresponding to the radio protocol stack) functions as a local SDN controller (in addition to performing functional traditionally performed by relay agents in a conventional e-NodeB). The local SDN controller for the radio protocol stack may also be referred to as a SD device controller.

More specifically, the local SDN controller communicates with the RAN SD i-Switching controller for dynamically configuring correct relay information between the radio protocol stack and backhaul protocol stack. In one example embodiment, if the local SDN controller has no information (software defined rules) on how to handle data packets transmitted/to be transmitted from the server 106-1 (assuming that the server 106-1 is in charge of implement the fronthaul processing of the radio protocol stack) and the corresponding one of the RRHs 104, the local SDN controller may handle the data packets according to a default set of software defined rules (e.g., forwarding data packets towards a default backhaul protocol stack, and/or communicate with the RAN SD i-Switching controller according to an SDN philosophy (set of software defined instructions).

Furthermore, the local SDN controller may serve as a proxy for radio resource slices towards network slices via coordination with the RAN SD i-Switching controller. In one example embodiment, the local SDN switch provides Quality of Service (QoS) for each network slice via QoS metering. Also, the local SDN controller may further include intelligence for local decision making (e.g., analytics-based radio resource optimization) to enable more efficient operation of the vRAN.

In one example embodiment, the local SDN controller (attached to each server implementing a radio protocol stack) receives IP/data packets from one or more of the user devices 102 and searches a local forwarding table. If a match is found in the internal forwarding table, the local SDN controller performs a processing according to the match found in the local forwarding table (e.g., performing a processing by implementing a radio protocol stack or a backhaul protocol stack, as will be further described below).

For example, if the IP/data packet is destined for one of the EPCs 108 (e.g., the upper EPC shown in FIG. 1, hereinafter referred to as EPC1), the processing of the IP/data packet would modify the IP/data packet information to indicate "source/destination IP matched: push VLAN1 (towards EPC1 SGW1)". As another example, if any matching entry is found in the local forwarding table for forwarding the received IP/data packet towards an edge cloud, the processing of the IP/data packet would modify the IP/data packet information to indicate "source/destination IP matched: forward edge cloud 1", and therefore, the IP/data packet may be directly forwarded to the edge cloud as opposed to one or more of the EPCs 108.

Furthermore, for routing IP/data packets (e.g., managing data packet flows, which will be further describe below) between one or more of the servers 106-1 to 106-5 implementing radio protocol stacks and one or more of the servers 106-1 to 106-5 implementing backhaul protocol stacks, any one of VLAN (L2 solution), IP-in-IP encapsulation, or Q-in-Q encapsulation, IP header configuration (e.g., network address translation (NAT)) may be utilized.

In one example embodiment, an SD relay agent (corresponding to the backhaul protocol stack) functions as a local SDN controller (in addition to performing functional traditionally performed by relay agents in a conventional e-NodeB). The local SDN controller for the backhaul protocol stack may also be referred to as a SD device controller.

More specifically, the local SDN controller of the backhaul protocol stack communicates with the RAN SD i-Switching controller to dynamically configure correct relay information between the backhaul protocol stack and the radio protocol stack. In one example embodiment, if the local SDN controller has no information (software defined rules) on how to handle data packets transmitted/to be transmitted from the server 106-4 (assuming that the server 106-4 is in charge of implementing the backhaul processing of the backhaul protocol stack), the local SDN controller may handle the data packets according to a default set of software defined rules (e.g., forwarding data packets towards a default backhaul protocol stack, and/or communicate with the RAN SD i-Switching controller according to an SDN philosophy (set of software defined instructions). Furthermore, the local SDN controller may serve as a proxy for radio resource slices towards network slices via coordination with the RAN SD i-Switching controller. In one example embodiment, the local SDN switch provides Quality of Service (QoS) for each network slice via QoS metering.

So far, example embodiments described above, enable one of the servers (e.g. server 106-1) of the network of servers 106 to implement the fronthaul processing of data packets by the radio protocol stack and another one of the servers (e.g. server 106-4) of the network of servers 106 to implement the backhaul processing of data packets by backhaul protocol stack. Furthermore and in one example embodiment, another one of the servers (e.g., server 106-3) implement the RAN SD i-Switching controller.

Accordingly, different servers from among the servers 106-1 to 106-5 of the network of servers 106 may be used to implement various baseband processing (e.g., vBBU functionalities) of data packets with the addition of providing the functionality of the RAN SD i-Switching controller, which manages the routing of processed data packets between various servers of the network of servers 106. It should be noted that while each baseband processing functionality, may be performed by a different server from among the servers of the network of servers 106, each baseband processing as well as the RAN SD i-Switching functionality may all be performed by one of the servers in the network of servers 106. Furthermore, the network of servers 106 may be simultaneously used to implement the baseband processing of signals (i.e., vBBU functionalities) of two or more e-NodeBs.

Therefore, example embodiments provide for a dynamic management of vBBUs by a network of servers 106 depending on the number of service providers using the network of servers 106, traffic/load status and processing capacities of the servers of the network of servers 106, etc.

In one example embodiment, the RAN SD i-Switching controller mentioned above, coordinates (manages) switching/routing data packets between the radio and backhaul protocol stacks. In one example embodiment, the RAN SD i-Switching controller, implemented via the server 106-3 of the network of servers 106, manages all RAN network resources under its control. For example, the RAN SD i-Switching Controller establishes communication paths (e.g., for purposes of routing IP/data packets) between radio and backhaul protocol stacks (e.g., between the server 106-1 that performs fronthaul processing of the radio protocol stack and the server 106-4 that performs the backhaul processing of the backhaul protocol stack, as described in example embodiments above), between different radio protocol stacks (e.g., servers 106-1 and 106-2 each performing fronthaul processing of radio protocol stacks), between different backhaul protocol stacks (e.g., servers 106-4 and 106-5 each performing backhaul processing of radio protocol stacks), or between radio protocol stacks and other VNFs.

In one example embodiment, the RAN SD i-Switching controller has/develops necessary intelligence such as load balancing between radio and backhaul protocol stacks, traffic offloading after radio protocol stacks, resource isolation in case of network slicing, etc. For example, the RAN SD i-Switching controller may have a table (provided via software defined rules and instructions) for how to switch data packets between radio and backhaul protocol stacks. Accordingly, based on such table, the RAN SD i-Switching controller determines how to switch a data packet processed by the radio protocol stack (e.g., on the server 106-1) to another one of the servers of the network of servers that performs the backhaul processing of the backhaul protocol stack (e.g., on the server 106-4 or 106-5).

While in example embodiments above, certain servers of the network of servers 106 have been designated as being in charge of implementing the radio protocol stack, the backhaul protocol stack and the RAN SD i-Switching, in one example embodiment such designation might change dynamically. For example, while server 106-1 may be utilized to perform the fronthaul processing of the radio protocol stack, at a point in time and upon receiving a data packet from the RRH 104, the RAN SD i-Switching controller may determine that the server 106-1 is overload and may instead route the received data pack to another server that has a relatively lighter load (e.g., server 106-5) to perform the fronthaul processing of the radio protocol stack. The same may apply to other functionalities so that the designated server from among the servers of the network of servers 106 for carrying out radio, backhaul and switching functionalities, may dynamically change.

Figure 3:
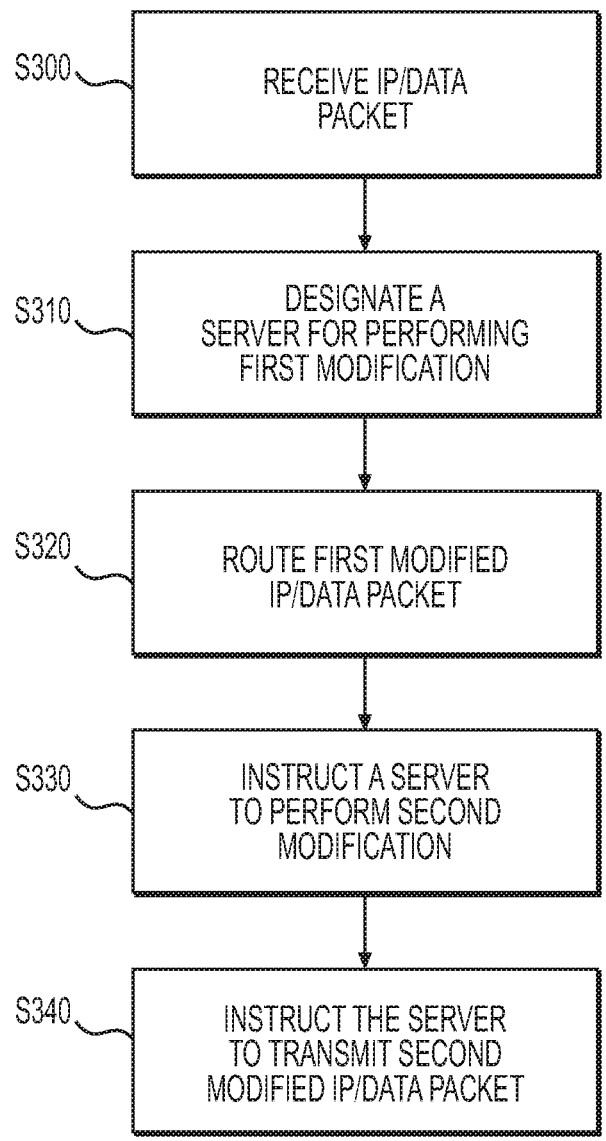
FIG. 3 is a flowchart of a method of operating a radio access network of a wireless communication system, according to an example embodiment.

FIG. 3 is a flowchart of a method of operating a radio access network of a wireless communication system, according to an example embodiment. The method of FIG. 3 is implemented from the perspective of the network of server 106 and more specifically from the perspective of one of the servers of the network of servers 106 that implements the functionalities of the RAN SD i-Switching controller, where the corresponding processor 200-1 executes appropriate computer-readable instructions. The computer-readable instructions may be easily modified, updated, reconfigured, adapted (by a vendor of the server 104, an operator of the network service provider, etc.), thus providing the above described flexibility and easy adaptation/network slicing.

In one example embodiment and prior to performing baseband processing by the servers of the network of servers 106, a wireless service provider may request the RAN SD i-Switching controller (e.g., implemented by the server 106-3) to provide the wireless service provider with a slice of the network 106 for performing baseband processing (e.g., provide a slice of network resources of the network of servers 106 to the wireless service provider). Accordingly, the RAN SD i-Switching controller slices the network 106, according to known or to be developed slicing methods.

In one example embodiment, the network resources (provided to the wireless service provider by slicing the network of servers 106) enable the wireless service provider to provide vBBU services (e.g., baseband processing of signals) to multiple service providers simultaneously.

With the assumption that a network slice has been provided to a requesting service provider, method of FIG. 3 will be described hereinafter.

At S300, an IP/data packet originating from and/or destined for the end devices (Internet of Things (IoT) devices, mobile devices, etc.) and/or core network elements, is received at the network of servers 106.

At S310, depending on the source and destination of the received data packets, the RAN SD i-Switching controller designates one of the servers (e.g., server 106-1) within the network of servers 106 to perform first modification of the received IP/data packet (depending on whether the IP/data packet is received at the network of servers 106 from the RRHs 104 or from the EPCs 108.

Thereafter, the designated server (e.g., server 106-1), via implementation of the appropriate one of the radio and backhaul protocol stacks, performs first modification on the received data packets. For example, when an IP/data packet is received at the network of servers 106 from one of the user devices 102 via one of the RRHs 104, the server 106-1 performs the first modification by executing the computer-readable instructions corresponding to a radio protocol stack. On the other hand, when an IP/data packet is received at the server 106-1 from the EPC 108 side of the network, the server 106-1 performs the first modification by executing the computer-readable instructions corresponding to a backhaul protocol stack.

In one example embodiment, the modifications of the IP/data packets, by the execution of either the backhaul protocol stack or the radio protocol stack, is performed as described above and may further be based on service provider's specifications and guidelines.

Thereafter, at S320, the RAN SD i-Switching controller, routes (manages) the first modified IP/data packets between the appropriate ones of the servers of the network of servers 106 (e.g., between appropriate ones of the servers implementing radio protocol stacks, between appropriate ones of the servers implementing radio and backhaul protocol stacks, between appropriate ones of the servers implementing backhaul protocol stacks, between appropriate ones of the servers implementing radio/backhaul protocol stacks and other VNFs, etc. As described above and according to one example embodiment, the RAN SD i-Switching controller routes (manages) the first modified IP/data packets depending on loading conditions, traffic conditions, service provider specifications, software defined routing instructions (e.g., software defined table described above), etc.

After routing the first modified IP/data packets to the appropriate ones of the radio and backhaul protocol stacks and before transmitting the routed data packets to intended destination(s), at S330, the RAN SD i-Switching controller instructs the appropriate one of the servers in the network of servers 106 to which the first modified IP/data packet is transferred, to perform second modification of the IP/Data packets (e.g., perform the second modification on the IP/Data packet(s) that has (have) undergone the first modification first, as described above). The servers that perform first and second modifications may or may not be the same. Furthermore, the server that performs the first and/or second modifications may be the same as the one implementing the RAN SD i-switching controller functionalities.

For example, if the first modification is performed by the server 106-1 by executing the computer-readable instructions corresponding to the radio protocol stack followed by routing the first modified IP/data packet to another server (e.g., server 106-4) implementing a backhaul protocol stack, the RAN SD i-Switching controller instructs the server 106-4 to perform the second modification by executing the compute-readable instructions corresponding to a backhaul protocol stack or a different radio protocol stack (in case the data packet is transmitted from one radio protocol stack to another radio protocol stack).

Moreover, if the first modification is performed by the server 106-4 by executing the computer-readable instructions corresponding to the backhaul protocol stack followed by routing the first modified IP/data packet to another server (e.g., server 106-1) implementing a radio protocol stack, the RAN SD i-Switching controller instructs the server 106-1 to perform the second modification by executing the compute-readable instructions corresponding to a radio protocol stack or a different backhaul protocol stack (in case the data packet is transmitted from one backhaul protocol stack to another backhaul protocol stack).

Accordingly, example embodiments enable independent operations of radio protocol stacks (e.g., a processing of the IP/data packet according to the first modification, described above) and backhaul protocol stacks (e.g., a processing of the IP/data packet according to the second modification, described above) by different (or same) servers.

Thereafter, at S340, the RAN SD i-Switching controller, instructs the server that performed (e.g., server 106-1 or server 106-4) the second modification to transmit the second modified IP/data packet to the intended destination. The server 106-1 or the server 106-4 may then transmit the second modified packet to the intended destination either directly (if the server 106-1 or the server 106-4 is directly connected to the intended destination (e.g., one or more of the RRHs 104 or one or more of the EPCs 108)) or indirectly via another one of the servers in the network of server 106.

The above described example embodiments for separating the radio and backhaul protocol stacks and managing communications therebetween via the RAN SD i-Switching Controller, provides several advantages. The first advantage is that it provides a highly flexible platform to implement diverse features for future mobile networks. For example, by virtue of software defined networking, network slices may be created as VNF Infrastructures (VNFI) such that RAN sharing may be implemented without a significant effort and the manageability thereof would be improved to realize programmable RAN sharing. Accordingly, Internet of Things (IoT) network slices may be dedicated for $3^{rd}$ IoT service providers. For example, the tight coupling of the radio and backhaul protocol stacks of e-NodeBs (discussed as a disadvantage of the currently available schemes) may be eliminated such that the number of radio and backhaul protocol stacks implemented by the server 106 no longer has to be the same and may be different, allowing the EPC core resources to scale independent of network 100 radio resources.

The second advantage is that any dynamic local breakout mechanism may be implemented in more efficient way, e.g., ultra-low latency IoT services at edge cloud. Depending on QoS/Quality of Experience (QoE) or mobility, networks of example embodiments described herein may be easily adapted.

The third advantage is that networks according to example embodiments described herein, may also be applied to a transparent Public Safety LTE Isolated Operation for Public Safety (PS-LTE IOPS) service, in case of disaster. In this case, the SDN capability immediately offloads the EPC connectivity to local PS-LTE EPC and dynamically provision any specific services (e.g., for first responders).

Variations of the example embodiments are not to be regarded as a departure from the spirit and scope of the example embodiments, and all such variations as would be apparent to one skilled in the art are intended to be included within the scope of this disclosure.

What is claimed:

1. A distributed platform, comprising:
a plurality of nodes for performing baseband processing of signals, at least one node of the plurality of nodes including,
at least one memory having computer-readable instructions stored therein, and
at least one processor configured to execute the computer-readable instructions to cause the at least one node to,
enable independent operations of a plurality of radio protocol stacks and a plurality of backhaul protocol stacks for performing the baseband processing functions of a plurality of base stations, each of the plurality of base stations being configured to serve one or more user devices,
receive data packets from, or destined for, at least one of the one or more user devices, and
manage data packet flows between the plurality of radio protocol stacks and the plurality of backhaul protocol stacks by,
instructing a first node of the plurality of nodes to implement a first one of the plurality of radio protocol stacks or a first one of the plurality of backhaul protocol stacks to perform a first modification of the received data packets,
routing the first modified data packets to a second node of the plurality of nodes, and
instructing the second node to implement a second one of the plurality of radio protocol stacks or a second one of the plurality of backhaul protocol stacks to perform a second modification of the routed data packets, and to transmit the second modified data packets to one or more intended destinations.

2. The distributed platform of claim 1, wherein the at least one processor is configured to execute the computer-readable instructions to cause the at least one node to manage the data packet flows by routing one or more data packets from,
any one of the plurality of radio protocol stacks or any one of the plurality of backhaul protocol stacks to any other one of the plurality of radio protocol stacks and any other one of the plurality of backhaul protocol stacks, and
any one of the plurality of radio protocol stacks or any one of the plurality of backhaul protocol stacks to one or more virtualized network functions implemented by the at least one processor.

3. The distributed platform of claim 1, wherein the at least one processor is further configured to execute the computer-readable instructions to cause the at least one node to,
receive a request from at least one service provider to provide a slice of the distributed platform to the at least one service provider, and
provide the slice to the at least one service provider, the slice providing resources to the at least one service provider to perform baseband processing of signals for at least one of the one or more user devices serviced by the at least one service provider.

4. The distributed platform of claim 3, the at least one node being any one of the plurality of nodes including the first node and the second node, wherein the at least one processor is configured to utilize the provided slice and execute the computer-readable instructions to cause the at least one node to, perform the first modification of the received data packets, manage the data packet flows by routing the first modified data packets to one of the plurality of radio protocol stacks or one of the plurality of backhaul protocol stacks, perform the second modification of the routed data packets, and transmit the second modified data packets to the one or more intended destinations.

5. The distributed platform of claim 4, wherein the at least one processor is configured to execute the computer-readable instructions to cause the at least one node to perform the first modification by implementing, the first one of the plurality of radio protocol stacks, or the first one of the plurality of backhaul protocol stacks.

6. The distributed platform of claim 5, wherein the at least one processor is configured to execute the computer-readable instructions to cause the at least one node to perform the second modification by implementing, the second one of the plurality of radio protocol stacks, or the second one of the plurality of backhaul protocol stacks.

7. The distributed platform of claim 3, wherein:

the plurality of base stations are virtual e-NodeBs, each having functionalities of an e-NodeB implemented by the at least one node of the distributed platform, and the at least one processor is configured to execute the computer-readable instructions to cause the at least one node to service two or more service providers simultaneously.

8. The distributed platform of claim 1, wherein the at least one processor is configured to execute the computer-readable instructions to cause the at least one node to receive the data packets via one or more remote radio heads, the one or more remote radio heads being remotely located relative to the distributed platform and communicating with corresponding user devices of the one or more user devices.

9. The distributed platform of claim 1, wherein a number of the plurality of radio protocol stacks is different from a number of the plurality of backhaul protocol stacks.

10. A method of performing baseband processing of signals on a distributed platform comprising a plurality of nodes, the method comprising:

enabling independent operations of a plurality of radio protocol stacks and a plurality of backhaul protocol stacks for performing the baseband processing functions of a plurality of base stations, each of the plurality of base stations being configured to serve one or more user devices;

receiving data packets from, or destined for, at least one of the one or more user devices; and managing data packet flows between the plurality of radio protocol stacks and the plurality of backhaul protocol stacks by, instructing a first node of the plurality of nodes to implement a first one of the plurality of radio protocol stacks or a first one of the plurality of backhaul protocol stacks to perform a first modification of the received data packets, routing the first modified data packets to a second node of the plurality of nodes, and instructing the second node to implement a second one of the plurality of radio protocol stacks or a second one of the plurality of backhaul protocol stacks to perform a second modification of the routed data packets, and to transmit the second modified data packets to one or more intended destinations.

11. The method of claim 10, wherein the managing the data packet flows includes routing one or more data packets from, any one of the plurality of radio protocol stacks or any one of the plurality of backhaul protocol stacks to any other one of the plurality of radio protocol stacks and any other one of the plurality of backhaul protocol stacks, and any one of the plurality of radio protocol stacks or any one of the plurality of backhaul protocol stacks to one or more virtualized network functions.

12. The method of claim 10, further comprising:

receiving a request from at least one service provider to provide a slice of the distributed platform to the at least one service provider; and providing the slice to the at least one service provider, the slice providing resources to the at least one service provider to perform baseband processing of signals for at least one of the one or more user devices.

13. The method of claim 12, further comprising:

utilizing the slice of the distributed platform to, perform the first modification of the received data packets, manage the data packet flows by routing the first modified data packets to one of the plurality of radio protocol stacks or one of the plurality of backhaul protocol stacks;

perform the second modification of the routed data packets; and transmit the second modified data packets to the one or more intended destinations.

14. The method of claim 13, further comprising performing the first modification by implementing, the first one of the plurality of radio protocol stacks, or the first one of the plurality of backhaul protocol stacks.

15. The method of claim 14, wherein the first modification is based on at least one of network traffic conditions and specifications provided by the at least one service provider.

16. The method of claim 13, further comprising performing the second modification by implementing, the second one of the plurality of radio protocol stacks, or the second one of the plurality of backhaul protocol stacks.

17. The method of claim 16, wherein the second modification is based on at least one of network traffic conditions and specifications provided by the at least one service provider.

18. The method of claim 10, wherein the data packet flows include at least one data packet transmitted between the one or more user devices and one or more evolved packet cores of one or more service providers.

* * * * *